United States Patent [19]

Dieterich et al.

[11] 3,998,179
[45] Dec. 21, 1976

[54] APPARATUS FOR OPERATING A PRESSURE GAUGE OR THE LIKE

[75] Inventors: Peter D. Dieterich, Boulder, Colo.; William H. Eiszner, Jr., Holland, Mich.; John P. Locke, Michigan City, Ind.

[73] Assignee: Dover Corporation, New York, N.Y.

[22] Filed: Jan. 13, 1976

[21] Appl. No.: 648,639

Related U.S. Application Data

[63] Continuation of Ser. No. 425,084, Dec. 17, 1973, abandoned.

[52] U.S. Cl. .......................... 116/129 D; 73/407 R; 74/210
[51] Int. Cl.² .......................................... G09F 9/00
[58] Field of Search ................ 73/407 R, 406, 419, 73/388 R, 209, 210, 141 A, DIG. 5; 116/129 D, 114 K, 70; 74/DIG. 4, 210

[56] References Cited
UNITED STATES PATENTS

2,201,836  5/1940  McCure ............................ 74/210

Primary Examiner—Donald O. Woodiel
Attorney, Agent, or Firm—Edwin L. Spangler, Jr.

[57] ABSTRACT

A mechanism for operating an instrument such as, for example, a gauge primarily for measuring pressure having a diaphragm the opposite faces of which are subject to a pressure differential so that the center moves in response to such differential. The diaphragm movement is transmitted to an array of bar magnets that moves in a substantially rectilinear translative movement in response to diaphragm movement. A rotary magnet spaced from the path of movement of the array of bar magnets and within the composite magnetic field produced by the array rotates as the array is translated, the angular rotation being a predetermined mathematical or empirical function of the amount of translation and built into the array. The mathematical function is achieved by proper choice of magnet dimensions and placement thereof relative to one another. Rotation of the rotor is used to drive a pointer indicator over a scale to indicate pressure. The invention resides primarily in the transductive mechanism and the novel transmission of the movement to a rotor for driving the said pointer indicator.

17 Claims, 8 Drawing Figures

APPARATUS FOR OPERATING A PRESSURE GAUGE OR THE LIKE

This is a continuation of application Ser. No. 425,084 filed Dec. 17, 1973, now abandoned.

BACKGROUND OF THE INVENTION

The invention is concerned principally with apparatus whose primary use is in instrumentation, although not necessarily so. The apparatus of the invention is, in effect, a transducer of a mechanical type. Motion which is basically translative in a substantially linear path is converted into motion which is rotary by such apparatus.

The simple function stated above is one which can be performed by many well-known mechanisms such as, for example, a rack and pinion gear meshing. The invention herein, however, evolves from the application of the said simple function to a case where there are two requirements which are not readily met by the prior art. One requirement is that the conversion occur through a physical barrier such as a hermetically sealed wall and the other requirement is that the conversion occur in accordance with a predetermined relationship.

The first-mentioned requirement is basically capable of being achieved by the use of magnets moving on opposite sides of the wall and having their magnetic fields linking through the wall, but the second function is believed not to have been achieved by any prior art known with the benefits and advantages of the invention as demonstrated by the specification which is submitted herewith.

This invention is exemplified hereinafter by a novel pressure gauge of the type in which a fluid is caused to move a pressure responsive member, such as for example the flexible center of a suspended diaphragm, the gauge having means for transducing this movement into the rotation of a pointer indicator moving over a suitable dial that is calibrated to read pressure units. As will be deduced from the preliminary remarks of this background discussion, the invention is considered broader and applicable to any apparatus which can utilize the novel transductive mechanism thereof. In gauges and instruments, the mechanism can be used for measuring other parameters besides pressure. In manufacturing processes, the mechanism is capable of functioning as a control element in feedback systems, furnishing a needed error movement one way or the other relative to a norm pre-established for normal operating conditions. The mechanism can be used to record or transmit information concerning movement. Since the practical application of the invention has been to the construction of a pressure gauge, the discussion hereinafter primarily will be limited to the description of such gauge, but no limitations are intended thereby. As for the gauge itself, features are provided which are believed novel in and of themselves in combination with the transducing or converting mechanism and these will be pointed out and claimed.

Any gauge for measuring a parameter is intended for continuous and automatic use to obviate the need for manual measurements and calculations using classical techniques. Accuracy and reliability are the principal ends sought and the apparatus of the invention is intended to provide these attributes. The invention, however, achieves other advantages which give characteristics that have been sought in other gauges but not always achieved, certainly not all in any known gauges.

In the type of gauge described a variable parameter is represented by a rectilinear mechanical movement that is transduced into a rotary movement for the purpose of driving a pointer indicator. The particular type of gauge is ideally suited for conditions where the meter movement carrying the pointer indicator is preferred or required to be physically isolated from the mechanical movement that is being produced by variation of the parameter being measured. This would be, for example, the case where there are fluids in the measuring portion of the instrument which could damage the meter movement or impair its reliable and accurate operation.

The invention teaches the use of a magnetic coupling to accomplish the isolation above mentioned, such coupling enabling a frictionless transmission of energy from the measuring movement to the drive for the pointer indicator.

There are many known schemes for transmitting motion through magnetic coupling in instruments. Several examples are disclosed in U.S. Pat. Nos. 2,745,027, 2,722,617, 2,564,676, 2,371,511 and 2,260,516. These examples have disadvantages which are obviated by the invention. The invention contemplates a small array of two or more bar magnets which moves in a substantially rectilinear translation relative to a single rotary magnet. A small movement of the array can be arranged to produce a relatively great movement of the rotary magnet, the spacing between the array and the rotary magnet being generous considering the sizes of the magnets thus permitting the intervention of a pressure or liquid barrier. The side by side location of the bar magnets and their field interference with one another enable the formation of a composite magnetic field which can cooperate with the magnetic field of the rotary magnet in order to shape the field as desired and thereby to control the resulting relationship between the rectilinear and rotary movements. In other words the function represented by the angular rotation of the rotary magnet for any given rectilinear movement of the bar magnet array can be established as desired.

One important type of function that can be achieved is a linear function, this being useful in cases where the parameter being measured varies linearly. The scale over which the pointer indicator driven by the rotary magnet swings can thus be made with uniform divisions, enabling easy interpolation and extrapolation.

Another important type of function that can be built into an instrument constructed according to the invention is a second order function for use in measuring pressures which vary as the square root. The pointer indicator then is arranged to move approximately logarithmically for a given rectilinear movement of the array, this being accomplished by properly dimensioning and positioning the magnets. Again the scale over which the pointer indicator sweeps will have substantially equal divisions.

It is essential for a complete understanding and appreciation of the invention to comprehend the state of the art as contrasted with the advance which is represented by the basic concepts of the invention.

In the prior art, the above-mentioned patents being examples, the transfer or conversion of movement by means of magnetic fields has been represented primarily by those cases in which there is a pole to pole confrontation so that the movement of a magnet relative to another magnet or the movment of a series of magnets relative to one another is accomplished by the magnetic forces linking pole to pole. In all such cases, so far as we are aware, the movement is not much different from meshing gears or the coupling afforded by rotating the field of a synchronous electromagnetic device to achieve rotation.

In such structures as known the movement achieved and the demands upon the apparatus engender limitations which many instrument makers cannot accept. Some of these disadvantages are mentioned hereinfter, but these do not comprise all.

The use of a large number of magnets to achieve a rack and pinion effect is not capable of being applied to the construction of most instruments. There is insufficient space, the weight increase cannot be tolerated, one and/or the other of the moving members (driving or driven) cannot accommodate or furnish the movement needed.

The achievement of a relationship between the driving and the driven magnetic parts is not likely to or has not been achieved with a result that scales of instruments have to be specially calibrated and in the case of second order parameters must be crowded at one end and spread at the other.

The gap between the magnetic parts has heretofore been too small for practical utilization. Even assuming that a barrier can be placed between these relatively moving parts, the pressures which can be accommodated in a given instrument are proportional to the thickness with which the barrier can be built. Small gaps and consequently small barriers can only be accommodated in low pressure instruments.

The description of the invention which follows shows these disadvantages are overcome and enables the reader to appreciate that many advantages in addition are achieved.

SUMMARY OF THE INVENTION

The invention comprises apparatus such as an instrument in which there is a movable member responsive to change in a physical phenomenon such as pressure, temperature and the like, the movement of the movable member being substantially rectilinear. The latter rectilinear movement in turn is used to produce a similar rectilinear movement in an array of two or more relatively short bar magnets having relatively large polar area arranged side by side along the line of movement of the array and with a common pole area of each magnet defining a plane. A rotary magnet polarized on opposite lateral sides is disposed with its axis parallel with the plane but disposed at right angles to the line of movement of the array.

The spacing of the rotary magnet and array are such that rectilinear movement of the array will rotate the rotary magnet on its axis, with a sufficient gap or space between the rotary magnet and array to accommodate a physical barrier blocking passage of fluid or transmission of pressure. The dimensions and positioning of the magnets relative to one another are such that the angular rotation of the rotary magnet is a predetermined function of the rectilinear movement of the array, such function being established upon construction of the apparatus and comprising for example first or second order functions. Any desired mathematical or empirical function can be built into the apparatus, the construction being characterized by a great flexibility in the capability of shaping of the magnetic fields through controlled interference fields.

In the apparatus described a meter movement with an accompanying pointer indicator is connected to the same shaft upon which the rotary magnet rotates. This apparatus comprises a gauge having added features. For example, the location of the rotary magnet shaft relative to the array of magnets of the gauge is adjustable, giving zero adjustments for the gauge without sacrificing sensitivity.

Other aspects of the invention will be detailed hereinafter.

DESCRIPTION OF THE PREFERRED EMBODIMENTS

As previously indicated, the invention is primarily concerned with a novel transducer or motion converting mechanism and apparatus for utilizing the same. In the specification herein, this apparatus takes the form of a pressure gauge for measuring differential pressure or other parameters. As also pointed out, the invention has a much broader base, its advantages being usable in many environments in addition to instrumentation.

Figure 1:
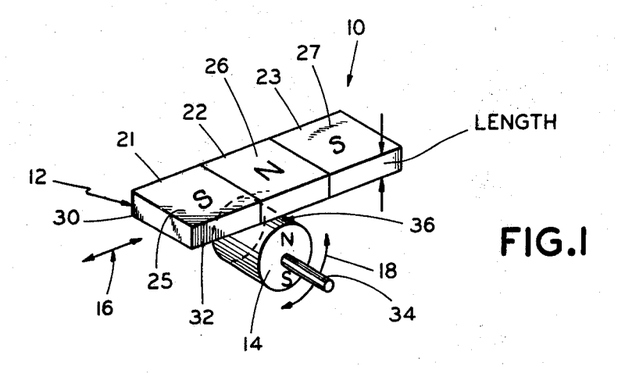
FIG. 1 is a perspective diagrammatic view of an array of three bar magnets shown with a rotor magnet positioned in magnetic field linking relationship therewith in some form of apparatus constructed according to the invention, in which the function of angular rotation of the rotor magnet with respect to the rectilinear movement of the array of magnets can be made linear.

In FIG. 1 there is illustrated in diagrammatic form the basic magnetic parts of a transducer or motion transferring apparatus 10 which is constructed and operates in accordance with the principles of the invention. There are two parts to the apparatus 10, these being the array of magnets 12 and the cylindrical magnet 14. For ease of reference, the array 12 may be called the "linear element" and the cylindrical magnet 14 may be called the "rotary element". It should be kept in mind, that the linear element 12 is not stationary but intended to move in a generally rectilinear movement which is indicated by the double headed arrow 16. The rotary element 14 is the driven part of the apparatus 10 and, while its axis remains stationary the magnet itself will rotate as indicated by the double headed arcuate arrow 18. The relationship between the amount of linear movement of the linear element 12 and the amount of angular movement of the rotary element 14 is in accordance with a predetermined law which is established during the construction of the elements, this law being a mathematical or near mathematical or empirical function in accordance with the desires of the constructor.

In the apparatus 10, the function can be made very close to a linear one, that is, the amount of angular rotation of the rotary element 14 in a given direction is very close to being directly proportional to the amount of rectilinear motion of the linear element 12. This function obtains over a rotary movement of the rotary element 14 which is of the order of 180° in a practical example not substantially different from that illustrated.

The linear element 12 of the apparatus 10 is an array of bar magnets 21, 22 and 23 connected together side by side. The magnets are configured with respect to their poles in a manner which is out of the ordinary. The fact that they are bar magnets is of significance only in the respect that they are not cylindrical as in the case of the magnet which comprises the rotary element 14. Each bar magnet has a length which is substantially less than either of its lateral dimensions. The length is that dimension which is normally thought of in connection with conventional bar magnets, that is, the distance between the opposite polar ends. In this case however, the length is the distance from the upper polar faces 25, 26 and 27 to their respective bottom polar faces which cannot be seen in FIG. 1. This assumes that all magnets 21, 22 and 23 have the same length which is normally the case in practical examples. The length is the dimension shown for the magnet 23.

The lateral dimensions of the respective magnets 21, 22 and 23, are for example the longer dimensions of the lateral surfaces 30 and 32 of the magnet 21, for example. The polar surface 25 thus becomes a rectangle whose area is substantially greater than the areas of any of the lateral surfaces such as 30 and 32.

The linear element 12 is formed by connecting a plurality of bar magnets side by side. In the case of the apparatus 10 of FIG. 1 there are three magnets, in the case of the apparatus 10' of FIG. 2 there are four magnets and in the case of the apparatus 10'' of FIG. 3 there are two magnets. The bar magnets 21, 22 and 23 may be cemented together by any suitable adhesive, generally being mounted on an arm of the apparatus as will be described. They are arranged with the polarities of adjacent magnets opposed, as shown, so that any given array will present the polar faces of alternate poles. In FIG. 1 the element 12 shows the arrangement with the polarity from left to right being south, north and south. On the bottom of the element 12, that is, the surfaces which face towards the rotary element 14 the polar faces will have the polarities from left to right of north, south and north. Since in practically all cases the lengths of all of the bar magnets making up an array or linear element will be the same, it can be taken that the bottom polar ends of the magnets 21, 22 and 23 of the linear element 12 define a plane and that this plane will under normal circumstances be parallel with the arm which supports the element. As a matter of fact, the plane defined is spaced from and parallel with the same plane that is defined by the bottom surface of the arm to which the element is cemented. The polar surfaces 25, 26 and 27 will normally be adhered to the said bottom surface of the arm.

The rotary element 14 is a cylindrical magnet but is not polarized like most conventional cylindrical magnets. Instead it is polarized on generally diametrically opposite lateral sides. This is shown in FIG. 1 by the letters N and S placed on the end face that can be seen to indicate that the lateral edges are oppositely polarized. For the arrangement illustrated, the rotary element 14 is located near the center of the element 12 with its axis in a plane spaced from the bottom plane defined by the bottom polar ends of the magnets 21, 22 and 23 and at right angles to the direction of movement of the linear element 12. The axis of the rotary element 14 is also the axis of a shaft to which the rotary element 14 is normally attached in a practical example, and a short length of such shaft is shown at 34. It is clear that the shaft 34 and the double headed arrow 16 are at right angles with respect to one another.

The spacing of the axis of the rotary element 14 from the plane defined by the bottom polar surfaces of the magnets 21, 22 and 23 takes into consideration the diameter of the rotary element 14 and is required to be sufficient to leave a gap 36 that will accommodate the barrier discussed above. According to the invention, this gap 36 is proportionally much bigger than previously possible with prior art arrangements thus permitting the interposition of barriers of substantial thickness to resist extremely high pressures.

The apparatus 10 is of one configuration which will provide for the mechanical conversion of a substantially rectilinear movement (arrow 16) into a rotary movement (arrow 18) wherein the amount of angular movement of the element 14 is very closely proportional to the amount of such rectilinear movement of the element 12. This structure is ideal for many different type of measurements, such as for example liquid level and the like.

The linear function response, like other types of response, is produced by shaping the magnetic fields of the two elements 12 and 14 and their relationship. This is done by proper choice of dimensions, field strength, gap and so on. While the proper requirements must be worked out for the individual cases, the basic teachings of the invention point the way and make experimentation minimal. The use of the short length bar magnets arranged side by side and having relatively large polar areas compared to their lateral side areas, the cylindrical magnets with its lateral edges polarized and the geometric relationship of these elements provide the basis for practically any setup. Moreover, obtaining rotary movement of the order of 180° and more in first and second order function transduction is simple by means of the teachings of the invention. The magnetic fields of the bar magnets 21, 22 and 23 interfere with one another and this is used to help shape the overall field.

By way of example, a linear apparatus using commercial magnetic materials (for instance, Alnico, produced by General Electric) would have three magnets like 21, 22 and 23, arranged side by side to provide a dimension in the direction of the arrow 16 of about 1¼ inches, a lateral dimension at right angle to the arrow 16 of about one-half inch and a length of magnet (between the poles) of one-eighth inch. The lateral dimensions of the respective magnets in the direction of the arrow 16 is not necessarily equal but may require adjustment. The rotary magnet element 14 is ⅝ inch long and ⅜ inch in diameter. The gap 36 is about 0.2 inch. The magnetic elements are polarized as shown. Neutral position for the element 14 is close to the center of the element 12.

Before continuing with the remaining explanation of the invention, it should be pointed out that the dimensions and proportions control the interference between magnetic fields and the shape of the overall magnetic field and that it is this shape which gives the desired response. It is feasible to multiply or divide movement by this technique and to do so with gaps that are quite wide so that the resulting apparatus can be practical and useful. Modern methods of magnet manufacture and magnetization enable the manufacture of an element like 12 out of a single member with the polarization as shown. The element 14 could be polarized with the poles not necessarily diametrically opposite and not necessarily of equal geometrical configuration.

Figure 2:
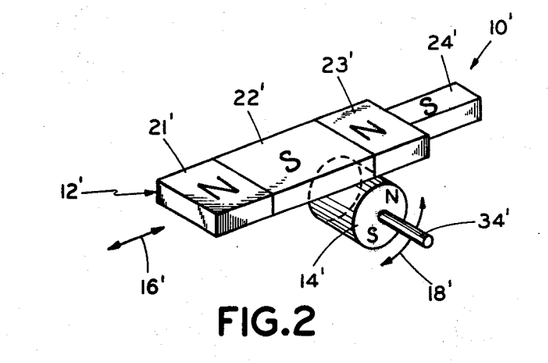
FIG. 2 is a perspective view similar to that of FIG. 1 but in this case, the function of angular rotation can be made a square root function, or nearly so.

In FIG. 2 there is illustrated an apparatus 10' which is formed of elements 12' and 14' whose functions are respectively substantially the same as the elements 12 and 14 of the apparatus 10 of FIG. 1. In this apparatus, however, the sizes of the magnets 21', 22' and 23' differ somewhat from their counterparts of FIG. 1. The end magnets 21' and 23' are smaller than the center magnet 22' and hence have smaller polar areas. They produce less interference than larger magnets would. In addition, there is a laterally narrower end magnet 24' at the right hand end. All the magnets of the element 12' have the same length (top to bottom as viewed) and they are assembled together. This element 12', when moved rectilinearly in the direction of the arrow 16' will produce a rotary movement of the rotary element 14' in the direction of the arrow 18' which is angularly proportional to the square root of the linear movement of the element 12'. This type of apparatus is ideally suitable for flow measurements since the relationship between the output of a flow transducer and the flow volume or velocity in the case of a typical head type flow meter is a square root one. The shaft 34' will rotate as the square root of the movement in direction 16'. The element 12' could be constructed using three magnets or five. As emphasized above, the criterion is the pattern or shape of the magnetic field and this is a matter of geometry and magnet strength. In the four magnet array, the proportions are derived from substantially the same scale as that for the apparatus 10 of FIG. 1 for a practical example. The practical gauge to be described is illustrated with a magnetic setup exactly like that of FIG. 1, but it will be assumed to have a square root relation with rotary element movement. This is feasible as will be understood from the explanation.

Figure 3:
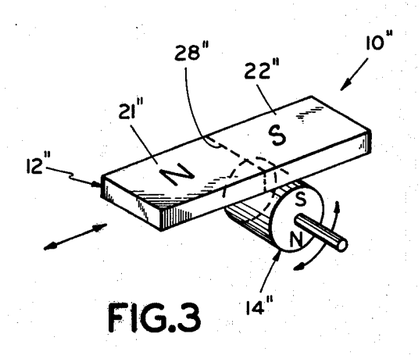
FIG. 3 is a perspective view similar to that of FIG. 1 but in this case the array comprises a pair of magnets. The functional relationship between the movements of the respective magnetic parts could be linear.

FIG. 3 illustrates a simple form of apparatus 10" which is constructed from the element 12", this latter being formed of only two magnets 21" and 22". The operation and construction are the same as previously explained except that in this case the element 12" is made of a single magnetic member and the individual magnets 21" and 22" are formed only be magnetization. Thus, there is no physical joint between them, the dotted line 28" being an imaginary line. Proper shaping of the total magnetic field can be achieved to obtain a relationship between rectilinear movement of the element 12" and the rotary element 14" which follows closely some predetermined function or empirical plan.

The application of the invention to a pressure gauge is detailed hereinafter by way of example. This embodiment of the invention is an excellent example because of the stringent requirements for a gauge of this nature. Also, there are features of the gauge which have novelty in and of themselves in combination with a transducing or converting apparatus constructed according to the invention. The setup of FIG. 1 has been assumed modified dimensionally to extract square root so that the gauge will measure differential pressure.

The pressure gauge to be described is one in which the movement of a diaphragm caused by the differential of fluid pressure on the opposite sides thereof is translated into the movement of an indicator pointer traversing a scale or dial. The means for converting the rectilinear movement of the diaphragm to the rotary movement of the indicator pointer includes a magnetic coupling utilizing a linear magnetic element comprising an array of bar magnets arranged side by side and mechanically connected to be translated by movements of the diaphragm disposed in magnetically coupled relationship with a rotary magnetic element. Translation of the linear element results in rotation of the rotary element according to a square root function and the indicator pointer which is mounted on the shaft of the rotary element moves over a scale of equal divisions.

By proper construction of the array of bar magnets and the adjustment or "shaping" of its combined field relative to that of the rotary magnet it is feasible to have the angular rotation of the rotary magnet and hence the sweeping movement of the pointer proportional to the square root of translation of the linear element or to have the relationship express other functions. This has been explaned above, but for example rotation can be achieved which is proportional to the linear translation of the magnet array. In this latter case the gauge could be utilized for the measurement of liquid level, for example. In the former case, the gauge could be used for flow measurement.

The principles of operation of the gauge are best explained in connection with FIG. 4 which is a kinematic diagram thereof.

On the left hand side of the diagram there is illustrated a diaphram 40 which is fixedly secured to a chassis or framework. This is represented by the rigid connections at 42 and 44 to a symbolic fixed frame represented at 46. The right and left sides of the diaphragm 40 are exposed to fluids whose relative pressure will cause the central area of the diaphragm 40 to flex toward the body of fluid that has the lower pressure. In the construction of the gauge the arrangement will be such that the lower pressure fluid body will normally be on the left as shown in FIG. 1 and thus, when subjected to some fluid which has a higher pressure and is disposed on the right side of the diaphragm, the flexing movement of the diaphragm 40 will be to the left as indicated by arrows.

On the right side of the diagram there is shown a resilient member in the form of a leaf spring 48 having an L-shaped configuration and thus comprising an elongate body 50 and an arm 52. The body 50 is substantially parallel with the diaphragm 40 and has its upper end rigidly connected at 54 to the frame 46. A link 56 is connected between the center of the diaphragm 40 and the center of the body 50, these connections practially being fixed. The connection 58 with the diaphragm 40 is not subjected to any lateral moment because the flexing of the diaphragm occurs only at its center, but there is a slight moment at the connection 60 since the upper end of the body 50 will remain fixed while its lower end together with the arm 52 will move. The link 56 therefore has a flexible part 57 at its right hand end to accommodate such movement.

The flexing movement of the center of the diaphragm 40 will be transmitted by way of the link 56 to the central portion of the body 50 and will exert a bending force upon the body 50. The axis of bending will be substantially the point of the adjustable fulcrum 62 whose position can be raised or lowered as indicated by the arrows. The higher the fulcrum 62 the easier it is to flex the body 50. The movement of the arm 52 can thus be adjusted for any given flexing of the diaphragm 40 and hence can be calibrated for various pressure ranges.

The flexing of the center of the diaphragm 40 to the left as indicated by the arrows will also cause the lower end of the body 50 to move to the left as indicated by the arrow on the body 50 below the connection 60.

On the arm 52 there is disposed an array 12 of bar magnets comprising the linear element of apparatus 10. Like that of FIG. 1, the linear element 12 is formed of three magnets 21, 22 and 23 arranged side by side. The magnets are disposed with their polarities as shown, the exact configuration and disposition being detailed in connection with FIG. 1. The practical structure has these magnets 21, 22 and 23 cemented to the arm 52. The operation of the gauge requires that the linear element 12 be translated substantially rectilinearly with the arm 52; hence under the circumstances mentioned above, movement will be to the left when the center of the diaphragm 40 moves to the left.

According to the invention, there is a rotary element 14 polarized as shown and mounted on a suitable shaft 34 journalled for rotation on an axis normally fixed relative to the movement of the linear element 12. The rotary element 14 has its magnetic field coupled with the composite magnetic field of the array of magnets of linear element 12 and hence when the two fields are so coupled the magnets producing the fields tend to have forces applied thereto by the magnetic lines of force which seek to result in a balanced total field. In such a balanced field there are substantially no forces exerted on the magnets for moving the same. When an equilibrium condition is initially established with zero differential pressure on opposite sides of the diaphragm 40, the components of the gauge are adjusted so that the pointer indicator 66 that is mounted on the shaft 34 is aligned with the zero indication of a suitable dial intended to read pressure (or other quantity). When there is pressure applied to the diaphragm 40 in the direction of the arrows of FIG. 4 then the linear element 12 will move to the left and, in order to maintain the condition of magnetic field equilibrium the rotary element 14 will rotate in a counterclockwise direction indicated by the arcuate arrow of FIG. 4. The rotation continues until no more magnetic force is applied to the rotary element 14 and the coupled magnetic fields of the magnetic array of linear element 12 and the cylindrical magnet of the rotary element 14 are in balance. Obviously the pointer indicator 66 will swing in the same direction and the same angular extent that the rotary element 14 rotates.

Figure 4:
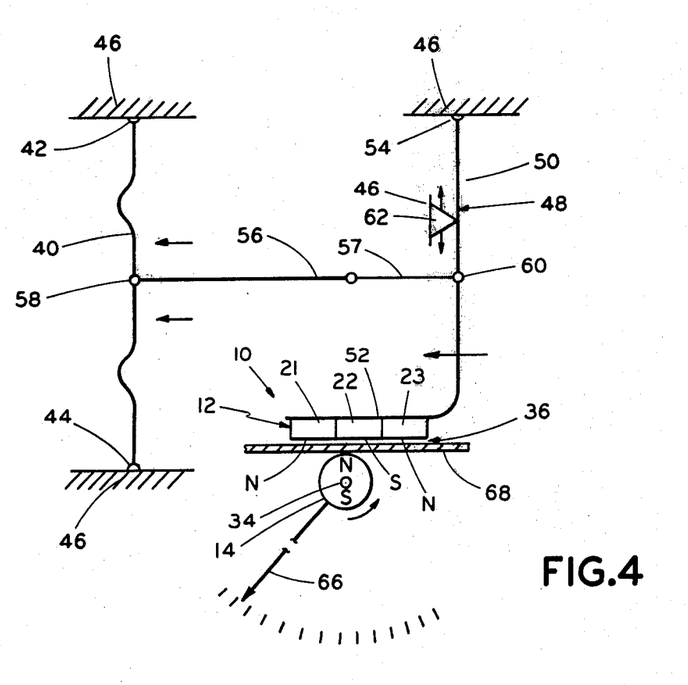
FIG. 4 is a kinematic diagram illustrating a pressure gauge constructed with the mechanism of the invention and utilized in connection with the specification to explain the operation of the pressure gauge.

The axis of the rotary element 14 and the shaft 34 upon which the same is fixed is disposed spaced from the plane defined by the bottom polar surfaces of the array of magnets 21, 22 and 23 in FIG. 4 as in FIG. 1. As stated this plane is that surface of each magnet which is facing downwardly as viewed in FIGS. 1 and 4. The upper polar surfaces of these magnets, identified in FIG. 1 as 25, 26 and 27 are cemented to the bottom surface of the arm 52. This arrangement includes the provision of a gap 36 between the linear element 12 and the rotary element 14.

The gauge which will be described in some detail is of a type intended for use in measuring liquid levels, flow rates and the like characteristics of fluids. Aside from the fact that fluids may be viscous, corrosive, and have suspended material of a deleterious nature therein, it is not advisable to subject the so-called "meter movement" that includes the shaft 34 and its suspension to exposure by liquids. The rotary magnet element 14 and pointer indicator 66 are also best not immersed in any liquids. In order to keep the meter movement dry there is a non-magnetic barrier 68 in the gap 36 between the rotary element 14 including the meter movement on the one hand and the linear element 12 on the other hand. This barrier 68 prevents fluid from either of the bodies on opposite sides of the diaphragm 40 from entering the part of the gauge which contains the rotary element 14, the pointer indicator 66, the shaft 34 the suspension of the meter movement, etc. Obviously the pressure exerted by the fluids is also contained, and the barrier 68 may be termed a pressure barrier. Its thickness and hence the pressure that it can withstand is determined by the distance across the gap 36.

From the above description one may deduce the important characteristics of this type of apparatus which renders it highly effective in making measurements where a mechanical movement which originates within a fluid must be transmitted to an element outside of the fluid. This can be done by the device of the invention because the lines of magnetic force freely pass through the non-magnetic pressure barrier 68 obviating the need for a mechanical connection between the "wet" and "dry" parts of the gauge. The benefits of the invention are thus advantageously felt when the invention is applied to a gauge which is designed to measure differential pressures in fluid on opposite sides of a movable pressure responsive member such as a diaphragm. This fact, and as well the fact that the detailed description hereinafter has as its subject matter such a gauge are not intended to limit the application of the invention to this particular environment.

Many different types of motion produced by physical phenomena of a wide variety can be translated into the rotation of a pointer indicator using the teachings of the invention. Such apparatus may or may not require intervening barriers of the type mentioned as a pressure barrier 68. Changes in temperature, velocity, acceleration, illumination etc. can be measured through the use of gauges constructed in accordance with the principles of the invention. Where conditions are such that the invention provides advantages not achieved through the use of gauges normally utilized for the purposes, the applicable structure can be produced from the teachings set forth herein.

In addition to the use of the invention in gauges, the apparatus is suited for use in control structures where variation from a predetermined value of a parameter must be detected and the information fed back to an operating process to correct for the change. The apparatus can also be used in connection with structures for recording and transmitting information on the variation of a parameter. In every case it is seen that the parameter can be one which occurs in an environment that should be physically insulated or isolated from the output of the responsive apparatus so that the information can be transmitted through a barrier by means of the coupling of the magnetic fields of a linear and a rotary element.

Attention is now invited to FIGS. 5 through 8 which illustrated a pressure gauge that embodies the teachings of the invention. Where feasible, the same reference characters will be used to relate the illustrations with the subject matter of FIGS. 1 and 4.

The gauge 70 has a housing 71 which is preferably formed of some high impact plastic suitably molded. Preferably this would be a thermosetting resin such as a polysulfane material which may be reinforced by suitable fillers such as glass fibers and highly resistant to corrosives while having the ability to withstand high pressures. Other parts of stainless steel where outside the magnetic fields. A panel 74 is mounted to the front of the housing 71 by means of the screws 76 passing through the panel. A suitable scale 78 is printed or otherwise mounted on the panel 74. A cover plate 76 with a glass window 78 and bezel 80 is mounted on the panel 74 by screws 82 passing through the cover plate and into the panel 74. The cover plate 76 protects the pointer indicator 66 and its mounting.

The housing 71 has two principal exterior parts held together by bolts. The low pressure part is 84 shown in FIG. 6, the high pressure part 86 is shown at the right in FIGS. 7 and 8 and the bolts are designated generally 88 and are suitably spaced around the parts to hold them together at the joint 90. Gasket or O-rings contain the pressures and fluids. The panel 74 is shown partially broken away in FIG. 8. There are two chambers formed in the housing 71, a high pressure chamber 92 and a low pressure chamber 94. The high pressure side of the fluid source is connected to the chamber 92 by way of the fitting 96 and the low pressure side of the fluid source is connected by way of the fitting 98 to the chamber 94. The fittings are gasketed in conventional manners. High and low pressure bleed fittings 100 and 102 are provided at the top of the housing 71 to enable the air to be bled off and the chambers fully filled with the fluids.

An internal annular ended member 104 closes off the high pressure chamber 92 and provides means for mounting the diaphragm 40 and the linkages. The left hand face of the member 104 has annular configurations which are indicated at 106 coaxial with the diaphragm to conform thereto and provide back-up therefor, and the internal face of the part 84 also has such conforming configuration 108 for the same purpose. The diaphragm 40 is of highly stable elastomeric material such as Viton and circumferential edge is beaded as shown and clamped in position in the joint 90. This beaded edge serves as an O-ring. The connections 42 and 44 actually are parts of the same joint and comprise an annular engagement of the entire circumference of the diaphragm. The diaphragm is sandwiched between a thick disc 110 or resinous material and a thin metal disc 112, there being a threaded stud 114 comprising part of the connection 48 passing through the discs 110 and 112, the center of the diaphragm 40 having a nut 116 thereon to secure the diaphragm in place over the passageway 118. This passageway 118 is the only fluid passageway between the high and low pressure chambers. Washers and other means are used to connect the assembly supporting the diaphragm 40 rigidly to the link 56.

The link 56 has a helical spring 120 coaxially mounted thereon between an adjustable seat 122 and a fixed seat 124 formed in the right hand surface of the central member 104. The spring 120 biases the link 56 to the right so that fluid passing into the passageway 118 and intended to force the diaphragm center to move to the left must compress this spring 120.

The right hand end of the link 56 has a block 126 adjustably secured thereto to which is connected a very thin highly flexible strip of high tensile strength metal comprising the flexible part 57 of the link 56. This flexible part passes through a hole 128 in the body member 48, this member being secured at its upper end to the central member 104. This is equivalent of the frame 46 referred to in FIG. 4. The flexible part 57 is connected to the body member 48 indirectly, being mounted on the bottom keeper 129 of the spring 130 whose upper end is also connected to the member 104. The body member 48 is in the form of a leaf spring. From the keeper 129 there is a right angle bent strip of metal 134 that is welded to the bottom end of the body member 48 and has the arm 52 as its right angle bent part on the bottom end thereof. The junction 60 comprises the connection of the upper end of the member 134, the right hand end of the flexible link 57 and the bottom end of the spring 130. The flexible part 57 relieves any bending movement applied to the link 56 and the connection 58. It decreases any chances of remenant strain in the total linkage.

Pressure within the chamber 92 overcoming the pressure within the chamber 94 will force the diaphragm 40 to the left, pulling the link 56 to the left and compressing the spring 120. The flexible part 57 will also tend to move to the left pulling the bottom end of the body member 48 to the left and also the arm 52 to the left.

The internally threaded fulcrum 62 mounted on member 104 has its point engaging against the body member 48 as shown and hence the bottom of the body member 48 will tend to rotate about this point. The externally accessible screw 136 may rotate the shaft 138 to drive the fulcrum up or down. This enables adjustment of the range of the gauge 70 because of changing the effective length of the body member 48. The spring 130 exerts a bending force on the body member 48, which as stated, comprises a leaf spring. This insures contact between the body member 48 and the fulcrum 62 at very low differential pressures.

The apparatus 10 is incorporated into the gauge 70 as shown, the linear element 12 being connected to the bottom of the arm 52 and comprising the three magnets 21, 22 and 23. These are disposed and move within the chamber 92 that will normally be filled with fluid at high pressure. The rotary element 14 is disposed within an elongate cavity 140 that is wholly within one of the walls of the part 86 and has no connection with the chamber 92. This cavity is seen in end view in FIG. 7 and in a lengthwise section in FIG. 8. The gap 36 is the distance between the facing arrows in FIG. 7 and the barrier 68 comprises the wall between the chamber 92 and the elongate cavity 140. These magnets 21, 22 and 23 are sized differentially from those of FIG. 1 to produce a square root function.

Figure 5:
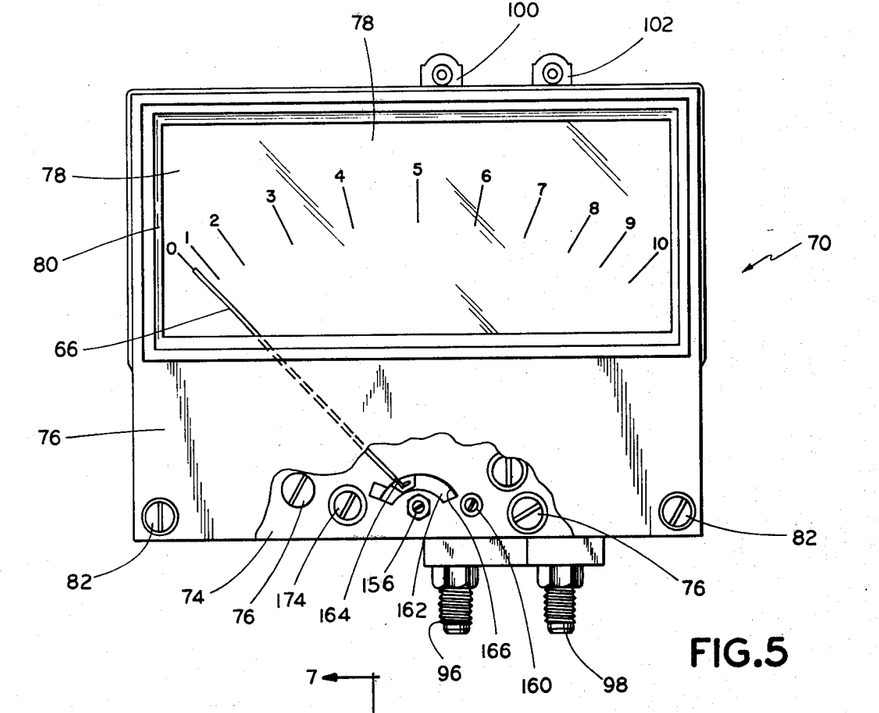
FIG. 5 is a front elevational view of a practical pressure gauge constructed in accordance with the invention.
Figure 6:
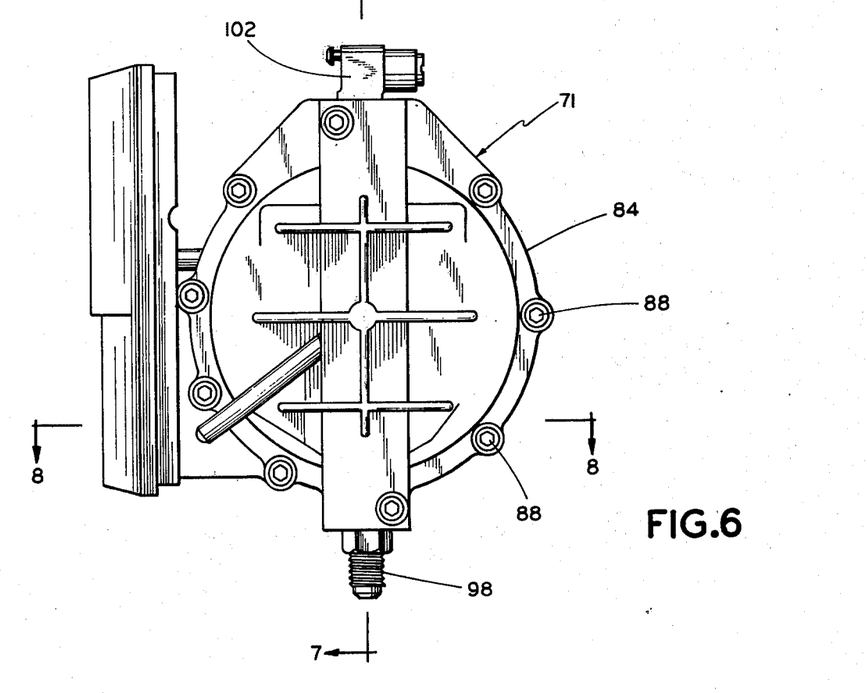
FIG. 6 is a side elevational view of the same.
Figure 7:
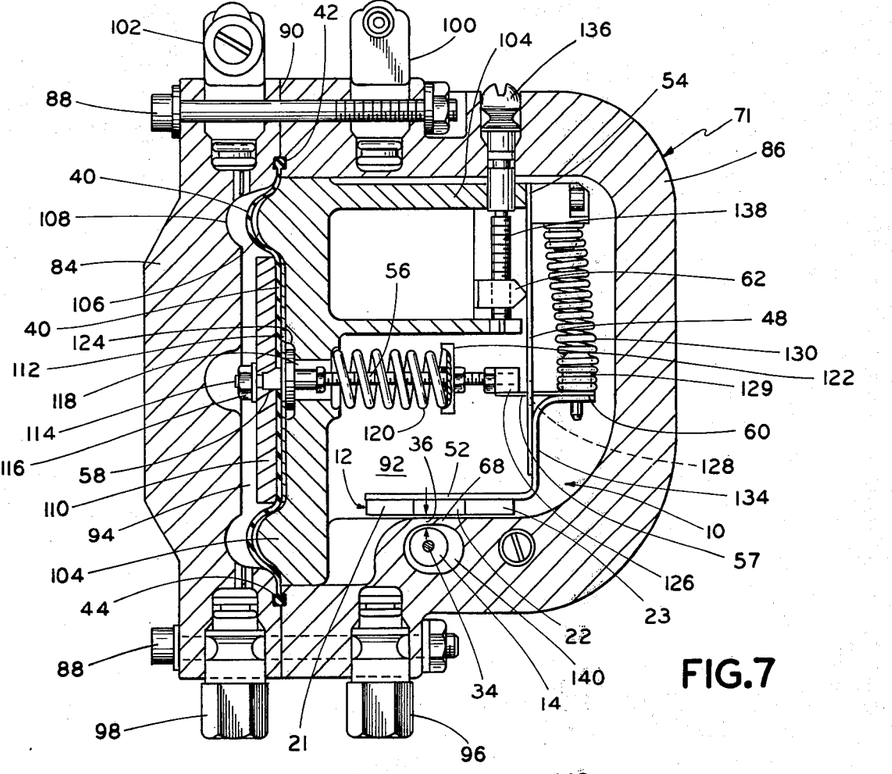
FIG. 7 is a sectional view taken generally along the line 7—7 of FIG. 6 and in the indicated direction.
Figure 8:
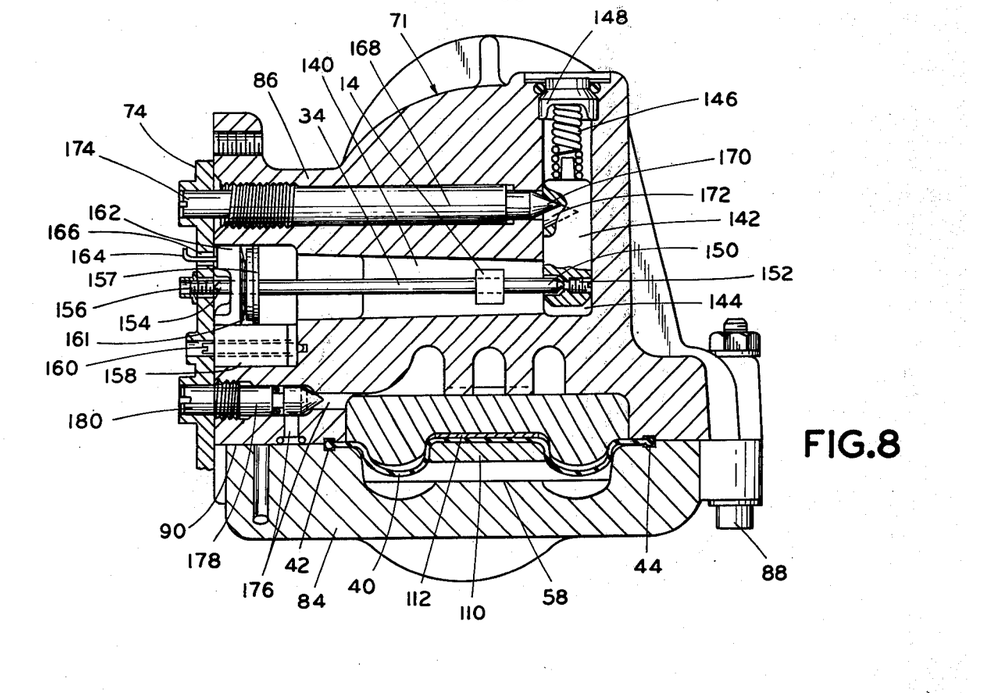
FIG. 8 is a sectional view taken generally along the line 8—8 of FIG. 6 and in the indicated direction.

The rotary element 14 is mounted to a light weight shaft 34 that is suspended as movements for delicate instruments. This could be a taut band suspension if desired, but a more conventional one is shown. There is a jewel block 142 that is mounted in a suitable socket 144 and biased to move to the left as viewed in FIG. 8 by the spring 146 pressing against the block. The assembly is installed through an opening in the member 86 and sealed as shown at 148. The shaft 34 has a pivot end 150 engaging a jewel 152 mounted in the block at the bottom of the cavity 140. Another pivot end 154 engages the jewel 156 at the top end, this latter jewel 156 being accessible through the panel 74 as shown in FIG. 5. There is a damping stator 157 mounted on a post 158 adjustable by means of the screw 160 to raise or lower the post and the stator 157 into closer spacing with respect to the damping rotor 162. The damping rotor 162 is fixed to the upper end of the shaft 34 as shown in FIG. 8 and it has an axially extending pin 164 that protrudes through a slot 166 in the panel 74. This pin has a fine aluminum tube telescopically engaged thereon, the tube comprising the pointer indicator 66. The space 161 between the stator 157 and the rotor 162 is capillary in dimension and filled wth a viscous oil. Decreasing this space by the screw 160 increases capillary drag.

The zero adjust is achieved by means of the pin 168 whose conical point 170 enters a suitable conical recess 172 in the block 142. The pin 168 is threaded into the member 86 and has a screw slotted end 174 access to which is had at the front of the panel 74. Moving the block 142 right and left will change the position of the rotary element 14 with respect to the linear element 12 and hence cause rotation of the shaft 34 in one direction or the other.

The operation of the gauge 70 is believed obvious from the description. There is an equalizing passage 176 between the two chambers which is controlled by a needle valve 178 whose slotted head 180 is accessible through the panel 74. Opening passageway 176 during zero adjustment equalizes pressure on opposite sides of diaphragm 40.

Many structures in addition to the illustrated gauge 70 may be constructed using the invention and many variations in such structures can be made without departing from the spirit or scope of the invention as defined in the appended claims.

What it is desired to secure by Letters Patent of the United States is:

1. A magnetically coupled motion transmitting mechanism comprising: first permanent magnet means having first and second poles of opposite polarity spaced from one another for rotating movement about a fixed axis therebetween, stop means coacting with the first magnet means to limit the rotational movement thereof to not more than approximately one half revolution, and second permanent magnet means mounted in spaced relation adjacent the first pole of the first magnet means for movement alongside thereof in a direction to rotate said first magnet means, said second magnet means having the surface thereof adjacent the first magnet means provided with a set of at least two poles arranged side-by-side in the direction of movement, said set of poles being alternately of opposite polarity and so spaced relative to one another and to the poles of the first magnet means that the fields thereof overlap and cooperate to define a composite magnetic field of a shape and strength effective upon movement of the second magnet means to exert a substantially greater influence upon the field of the first pole of the first magnet means than upon the field of the second pole thereof throughout the range of limited movement of said first magnet means, and said set of poles also including one pole of opposite polarity to the first pole of the first magnet means and an additional pole of the same polarity as said first pole, said first pole and said pole of opposite polarity being positioned relative to one another and to the stop means such that the magnetic attraction between said unlike poles diminishes as the first magnet means approaches said stop means upon rotation in at least one direction, and in which said additional pole of the same polarity as said first pole is so positioned relative thereto that repulsive forces exist therebetween of a magnitude effective to gradually override said diminishing attractive forces and exert an increasingly greater influence upon the movement of said first magnet means toward said stop.

2. The motion transmitting mechanism as set forth in claim 1 in which: the set of poles of the second magnet means includes a pair of poles of the same polarity as the first pole of the first magnet means and one pole of opposite polarity to that of said first pole, said first pole and said pole of opposite polarity being positioned relative to one another and to the stop means such that the magnetic attraction between said unlike poles diminishes as the first magnet means approaches said stop means upon rotation in either direction, and in which at least one of said poles of the same polarity as said first pole is so positioned relative thereto that repulsive magnetic forces exist therebetween of a magnitude effective to gradually override said diminishing attractive force and exert an increasingly greater influence upon the position of said first pole upon movement of said second magnet means in the direction of the other of said poles of the same polarity.

3. The motion transmitting mechanism as set forth in claim 1 in which: means comprising a leaf spring mounts the second magnet means for movement relative to the first magnet means.

4. The motion transmitting mechanism as set forth in claim 1 in which: the second magnet means comprises a single bar of magnetizable material having poles of opposite polarity induced in said adjacent and the remote faces thereof in back-to-back relation.

5. The motion transmitting mechanism as set forth in claim 1 in which: the set of poles of the second magnet means includes one pole of opposite polarity to the first pole of the first magnet means and a second pole of the same polarity as said first pole, and in which said first pole and the poles of said set are positioned relative to one another and to the stop means such that said first pole moves from a position on one side of the pole of said set having the opposite polarity to a position on the other side of the latter upon movement of said second magnet means in either direction over a distance effective to rotate said first magnet means through the full arc permitted by said stop means.

6. The motion transmitting mechanism as set forth in claim 1 in which: the first magnet means is cylindrical, and in which the first and second poles are disposed diametrically opposite one another.

7. The motion transmitting mechanism as set forth in claim 1 in which: the other of said poles of the same polarity as said first pole is so positioned relative to the latter that a repulsive magnetic force exists therebetween of a magnitude effective to gradually override the diminishing attractive forces and exert an increasing greater influence upon the position of said first pole upon movement of said second magnet means in the direction of the said one pole of said pair of poles of the same polarity.

8. The motion transmitting mechanism as set forth in claim 1 in which: both of said poles of the same polarity as said first pole are so positioned relative to the latter and to one another such that a combined repulsive force is established between all three such poles of like polarity effective to override said attractive forces and influence the position of said first pole over a substantial portion of the rotational movement of said first magnet means in both directions.

9. The motion transmitting mechanism as set forth in claim 1 in which: the leaf spring is fixed at one end, the second magnet means is mounted upon said spring at a point remote from the fixed end thereof, and in which said surface of said second magnet means adjacent said first magnet means moves through an arcuate path defined by the bending of said spring.

10. The motion transmitting mechanism as set forth in claim 1 in which: means defining a movable fulcrum operatively engaging said leaf spring so as to vary the effective length thereof is adjustably interposed between the fixed end of said spring and the second magnet means.

11. The motion transmitting mechanism as set forth in claim 1 in which: the set of poles carried by the second magnet means includes a pole of opposite polarity to the first pole of the first magnet means and at least one pole of the same polarity as said first pole, and in which said second magnet means and leaf spring cooperate in the relaxed position of the latter to locate the unlike pole of said set in closer proximity to said first pole than any of the poles of the same polarity as the latter in said set.

12. The motion transmitting mechanism as set forth in claim 1 in which: the second magnet means is mounted upon the spring means so as to bend same in one direction, and in which counterbalancing means is carried by said spring operative to counteract the bending effect of said second magnet means.

13. In a meter comprising a primary meter element displaceable in response to a parameter to be measured and means for indicating the displacement position of said primary element, the improvement comprising a magnetic coupling between said primary element and said indicating means, which magnetic coupling comprises:

a rotor mounted for rotational movement about an axis and mechanically coupled to said indicating means, said rotor having a single pair of magnetic poles of opposite polarity angularly displaced from each other around the axis of rotation; and an elongate bar adjacent but spaced from said rotor, the longest dimension of said bar extending transversely to the axis of rotation of said rotor, said bar having a first face facing said rotor and a second face remote from said rotor, said bar being mechanically linked to said primary meter element to move in the direction of its longest dimension and transversely to the axis of said rotation of said rotor in response to the position of said primary meter element, said bar having at least two magnets thereon along its length, each of said magnets having one pole on said first face and another pole on said second face of said bar, said poles of said magnets being arranged to present an alternating polarity on each face, said bar being in spaced relation to the rotor such that the fields of the magnets on said bar interreact with each other and with the magnetic field of the rotor to form a composite magnetic field effective to cause rotation of said rotor in response to the movement of said bar.

14. In a meter according to claim 13, the further improvement wherein said bar has from two to four magnets thereon.

15. In a meter according to claim 13, the further improvement wherein the magnets on said bar are of unequal strength, whereby the relationship between movement of said rotor and said primary meter element is non-linear.

16. In a meter according to claim 13, the further improvement wherein said bar contains three magnets, at least one of which is unequal in strength to at least one of the other two, whereby said position indicating means on said rotor moves non-linearly relative to the movement of said primary meter element.

17. In a meter according to claim 13, the further improvement wherein said bar is mounted on a lever means, said lever means being mechanically linked to said primary meter element, said lever means being so mounted as to cause said bar to move both transversely to and away from said rotor in response to movement of said primary meter element.

* * * * *